United States Patent [19]
Portnoy

[11] 3,759,066
[45] Sept. 18, 1973

[54] ELASTIC POWER TRANSMITTING ELEMENT

[76] Inventor: Samuel Portnoy, Simtat Beth Habad 9, Hod Hasharon, Israel

[22] Filed: Sept. 7, 1971

[21] Appl. No.: 178,164

[52] U.S. Cl............... 64/27 S, 64/13, 64/27 R, 192/107 R
[51] Int. Cl............................................. F16d 3/14
[58] Field of Search ............... 64/27 S, 27 B, 27 F, 64/27 R, 11 R, 13 R; 192/107 M, 107 R, 55

[56] References Cited
UNITED STATES PATENTS

| | | |
|---|---|---|
| 2,856,050 | 10/1958 | Mathews.......................... 192/107 R |
| 1,645,510 | 10/1927 | Wood................................. 64/27 R |
| 3,677,031 | 7/1972 | Zierak et al. .......................... 64/13 |

*Primary Examiner*—Charles J. Myhre
*Assistant Examiner*—Randall Heald
*Attorney*—Benjamin J. Barish

[57] ABSTRACT

An elastic power transmitting element comprises at least one disc- or plate-shaped member in which there is cut a spiral slot extending from near the center of the said element towards the periphery thereof, means being provided on the said disc- or plate-shaped member for connection thereof to the driving or driven shaft of a power transmission.

6 Claims, 4 Drawing Figures

Patented Sept. 18, 1973  3,759,066

INVENTOR
Shmuel PORTNOY

BY *Benjamin J. Barish*
ATTORNEY

ELASTIC POWER TRANSMITTING ELEMENT

The present invention relates to an elastic power transmitting element and more particularly to an element which is used in the transmission of rotatory movement.

The new power transmitting coupling of the present invention is capable of cushioning the shock upon transmission of rotary movement from one rotary shaft to the other, and is further capable of accomodating substantial misalignment of the two rotary shafts.

According to the present invention, the elastic power-transmitting coupling comprises a disc having a slot formed therethrough from one face to the opposite face, the slot extending in the form of a spiral continuously and uniformly increasing in size around the disc starting from a point adjacent its center and terminating at a point adjacent its outer periphery. The disc includes means for fixing same at its center to a shaft. Such a disc may be coupled or connected to a second shaft to effect the transmission of rotary movement between the two shafts. Shocks occurring upon the transmission of such rotary movement, such as under starting conditions, are cushioned by causing the spiral slot to decrease or increase in width, depending upon the direction of the shock.

According to a further feature, the coupling further includes a plate of the same shape as the disc overlying one face thereof and fixed to its outer periphery. Such a coupling is particularly useful, as will be described below, as one element of a friction clutch, the other element comprising a second disc and means for fixing same to the other shaft being coupled to the first one. At least one of the discs would include friction material for effecting the friction coupling between them.

According to a further embodiment of the invention, the coupling includes a second disc and means for fixing same to the other shaft, the two discs being fixed together at their outer peripheries. The second disc is also formed with a spiral slot similar to that of the first disc. Such a structure may be used as a permanent elastic, power-transmitting coupling between two shafts.

The invention will now be described in detail with reference to the annexed drawing which shows in a schematical manner two examples of application of the new element.

FIG. 1 illustrates the plate- or disc-shaped element according to the invention, as seen in a plan view, while

Figure 1:
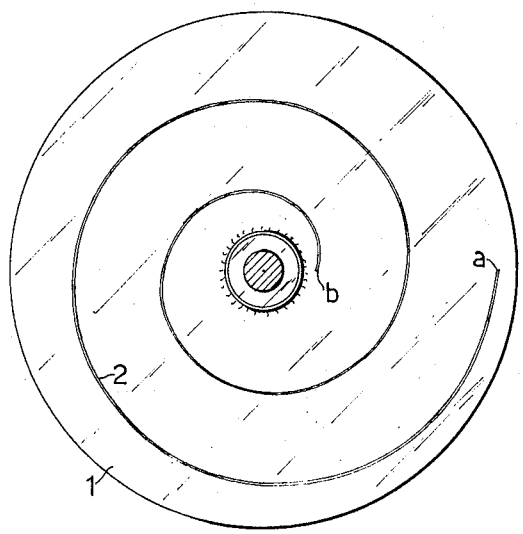
Figure 2:
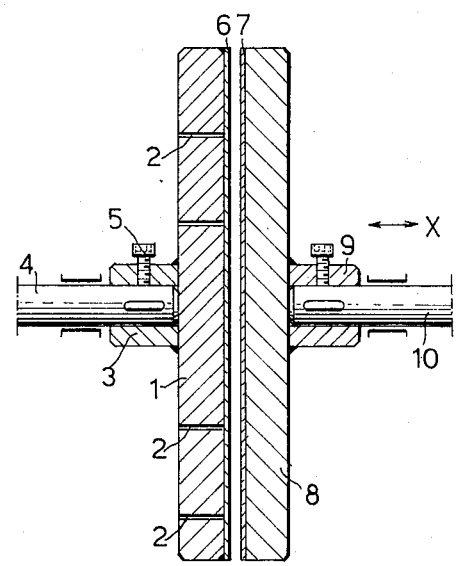
FIG. 2 is a sectional view of a power transmission incorporating a coupling in which the new element is used.

Turning first to FIG. 1, a steel disc 1 is provided with a spirally cut slot 2 which extends from a point $a$ near the periphery of the disc to a point $b$ near the center thereof. Slot 2 is formed through disc 2 from one face to the opposite face thereof, and extends in the form of a spiral continuously and uniformly increasing in size around the disc. The use of such an element will become clear from the following description of FIG. 2. The disc 1 with the slot 2 cut therein forms part of a coupling. To the disc, at one side thereof, is fixedly attached by welding or otherwise a socket member 3 into which extends a shaft 4 which maybe a shaft of an electric motor or another motor. The shaft 4 can be fixed within the socket 3 in conventional way by means of a screwbolt 5. Onto the periphery of the opposite face of the disc 1 is welded a steel sheet plate 6.

The now described assembly is intended for cooperation with a steel disc 8 which is provided with a friction coating 7. To disc 8 is also affixed a socket 9 at the center thereof and into the socket extends shaft 10 which is co-directional and co-axial with shaft 4. The assembly which comprises the disc 8 may be moved to and fro in the direction of the arrow $x$.

It is assumed that the shaft 4 is positively driven and accordingly the disc 1 performs the same rotatory movement. If the disc 8 by whatever conventional means is brought to contact with its friction coated face the face of disc 1, (i.e. the plate 6), the disc 8 and accordingly the shaft 10 will be taken along and will be imparted the same rotatory movement as is imparted to shaft 4.

There are already known various kinds of elastic couplings which all serve the purpose of cushioning the shock which is imparted to a machine by the drive thereof when the latter is put into operation. The abrupt start of a machine has undesirable effects and contributes very much to the wear and tear thereof. This is a well known fact and a great number of elastic coupling members are known in order to absorb and cushion the abrupt shock. The new coupling serves the same purpose: when the disc 1 is put into rotation torsion acts thereon and the spirally cut slot slightly narrows or enlarges, depending upon the direction of rotation. Thus the torsion acting on disc 1 absorbs the initial shock imparted to the coupling when the motor is set into motion abruptly.

Figure 3:
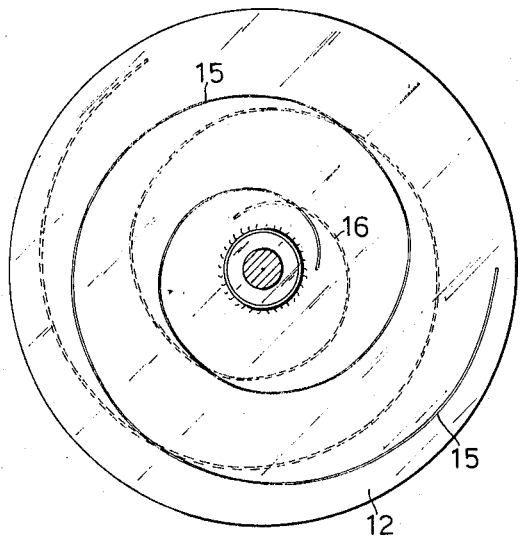
FIG. 3 shows in a view, like FIG. 1, a plate or disc-shaped element which is intended for use in a permanent connection between two portions of drive shaft. This application of the invention is shown in FIG. 4, again in a sectional view.
Figure 4:
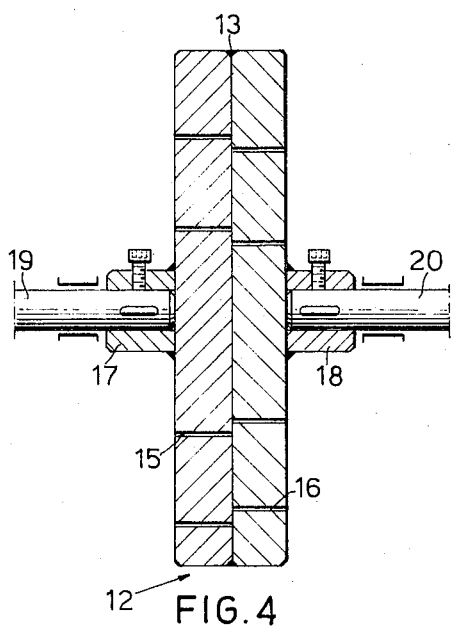

In the example according to FIG. 3 and 4 the new element comprises two discs which are united by welding face to face along their outer peripheries. The composite disc is designated by the numeral 12. Before uniting the two discs by means of a weld at 13 (see FIG. 4), into one of the discs a spiral slot 15 has been cut which is shown in FIG. 3 in full line, while in the second disc a spiral slot 16 is cut. This latter is shown in a broken line. As can be seen in FIG. 3 the spirals 15 and 16 may extend in opposite directions.

Turning now to FIG. 4 the two discs forming the assembly 12 are provided with sockets numbered 17 and 18, as in the case already described and a drive shaft composed of two portions 19 and 20, each of which enters the respective sockets 17 and 18, is provided. Thus in this case, the connection is a permanent one (in contradistinction to the releasable couplings in FIGS. 1 and 2). However, the function of the new element is similar. Whenever the motor driving the shaft is set in motion, the abrupt and shocklike start imparted to the respective, driven machine part is obviated, since such shock is absorbed or at least cushioned by the element constituted by the assembly of discs 12.

It should be understood that the invention is not restricted to the two examples shown. As has already been mentioned, the kind of couplings, i.e., where the invention is applied to couplings - may be different.

The slots (2, 15, 16) have been shown and described as having been cut in a direction normal to the face of the respective disc (1, 12). It would be within the scope of the invention to make the slots oblique to the respective face.

Furthermore, more than one spiral slot may be provided, thereby making the new element even "softer".

The new element may be made of steel, phospher-bronze or any other material of which such machine elements are conventionally made.

I claim:

1. An elastic power-transmitting coupling, comprising a disc having a spiral slot formed therethrough from one face to the opposite face thereof and extending around the disc starting from a point adjacent its center and terminating at a point adjacent its outer periphery, a plate of the same shape as said disc overlying one face thereof and fixed to its outer periphery, and means for fixing the center of the opposite face of the disc to a shaft, said disc and plate constituting one element of a clutch connectable to a second shaft to effect the transmission of rotary movement between the two shafts, the shocks occurring upon the transmission of said rotary movement causing the spiral slot to change in width whereby said shocks are cushioned.

2. A coupling as defined in claim 1, further comprising a second disc fixed to the second shaft, at least one of said discs carrying friction material for effecting a friction coupling therebetween.

3. An elastic power-transmitting coupling, comprising a disc having a slot formed therethrough from one face to the opposite face thereof, said slot extending in the form of a spiral continuously and uniformly increasing in size around said disc starting from a point adjacent its center and terminating at a point adjacent its outer periphery, and means for fixing said disc at its center to a shaft, said disc being connectable to a second shaft to effect the transmission of rotary movement between the two shafts, the shocks occurring upon the transmission of said rotary movement causing said spiral slot to increase or decrease in width, depending upon the direction of the shock, whereby the shocks are cushioned, said coupling further comprising a second disc fixed to the second shaft, said two discs being fixed together at their outer peripheries.

4. A coupling as defined in claim 3, wherein said second disc is also formed with a spiral slot therethrough from one face to the opposite face thereof, said latter slot also extending in the form of a spiral continuously and uniformly increasing in size around its respective disc starting at a point adjacent its center and terminating at a point adjacent its outer periphery.

5. An elastic power-transmitting coupling capable of cushioning shocks upon transmission of rotary movement from one rotary shaft to an other, and further capable of accomodating substantial misalignment of the two rotary shafts, comprising: a first disc having a spiral slot formed therethrough from one face to the opposite face thereof, and a second disc having a spiral slot formed therethrough from one face to the opposite face thereof, each of said slots being in the form of a continuous spiral extending around its respective disc starting from a point adjacent to the center of the disc and terminating at a point adjacent to its outer periphery, said two discs being joined together along their outer peripheries, the center of each of said discs including means for fixing thereto one of the rotary shafts.

6. A coupling as defined in claim 5, wherein said spiral slots are formed in opposite directions on the respective discs.

* * * * *